United States Patent
Kabus et al.

(10) Patent No.: US 10,430,947 B2
(45) Date of Patent: Oct. 1, 2019

(54) CORRESPONDENCE PROBABILITY MAP DRIVEN VISUALIZATION

(71) Applicant: KONINKLIJKE PHILIPS N.V., Eindhoven (NL)

(72) Inventors: Sven Kabus, Hamburg (DE); Heike Carolus, Hamburg (DE); Holger Schmitt, Luetjensee (DE)

(73) Assignee: KONINKLIJKE PHILIPS N.V., Eindhoven (NL)

(*) Notice: Subject to any disclaimer, the term of this patent is extended or adjusted under 35 U.S.C. 154(b) by 95 days.

(21) Appl. No.: 15/535,438

(22) PCT Filed: Dec. 2, 2015

(86) PCT No.: PCT/IB2015/059274
§ 371 (c)(1),
(2) Date: Jun. 13, 2017

(87) PCT Pub. No.: WO2016/097912
PCT Pub. Date: Jun. 23, 2016

(65) Prior Publication Data
US 2017/0365058 A1  Dec. 21, 2017

Related U.S. Application Data

(60) Provisional application No. 62/092,482, filed on Dec. 16, 2014.

(51) Int. Cl.
*G06T 7/00* (2017.01)
*G06T 7/35* (2017.01)
(Continued)

(52) U.S. Cl.
CPC ........... *G06T 7/0016* (2013.01); *G06T 7/344* (2017.01); *G06T 7/35* (2017.01); *G06T 7/38* (2017.01);
(Continued)

(58) Field of Classification Search
None
See application file for complete search history.

(56) References Cited

U.S. PATENT DOCUMENTS 6,195,003 B1  2/2001  Ichikawa
6,771,736 B2  8/2004  Sabol
(Continued)

OTHER PUBLICATIONS

Price, et al., "StereoCut: Consistent interactive object selection in stereo image pairs", Computer Vision (iCCV) 2011 IEEE International Conference, Nov. 6, 2011.
(Continued)

*Primary Examiner* — Tahmina N Ansari
(74) *Attorney, Agent, or Firm* — Larry Liberchuk

(57) ABSTRACT

A method generates and uses a correspondence probability map for visualization of two image datasets. The method includes obtaining two image datasets and obtaining an image registration algorithm that includes a correspondence model. The method further includes registering the two image datasets to generate a displacement vector field and generating a correspondence probability map, using the correspondence model, based on the two image datasets. The method further includes using the correspondence probability map to visualize the two image datasets. A computing system (120) includes a memory device (124) configured to store instructions, including a visualization module (130), and a processor (122) that executes the instructions, which causes the processor to generate and employ a correspondence probability map for visualization of two image datasets.

20 Claims, 3 Drawing Sheets

(51) Int. Cl.
    *G06T 11/00*     (2006.01)
    *G06T 7/38*     (2017.01)
    *G06T 7/33*     (2017.01)

(52) U.S. Cl.
    CPC ............ *G06T 11/00* (2013.01); *G06T 11/008* (2013.01); *G06T 2207/10081* (2013.01); *G06T 2207/20076* (2013.01); *G06T 2207/20221* (2013.01); *G06T 2210/41* (2013.01); *G06T 2211/412* (2013.01)

(56) References Cited

U.S. PATENT DOCUMENTS

| | | | | |
|---|---|---|---|---|
| 2007/0165943 | A1* | 7/2007 | Guetter | G06K 9/6212 382/159 |
| 2008/0243435 | A1* | 10/2008 | Deinzer | G06T 7/0012 702/181 |
| 2010/0091035 | A1* | 4/2010 | Kirchberg | G06K 9/342 345/620 |
| 2012/0081386 | A1* | 4/2012 | Wiemker | G06T 7/0012 345/589 |
| 2013/0230220 | A1 | 9/2013 | Yu | |
| 2013/0243302 | A1 | 9/2013 | Liu | |
| 2017/0365058 | A1* | 12/2017 | Kabus | G06T 11/00 |

OTHER PUBLICATIONS

Domke, et al., "A Probabilistic Framework for Correspondence and Egomotion", Oct. 21, 2005.
Christensen, et al., "Consistent Image Registration", IEEE Transactions on Medical Imaging, vol. 20, No. 7, Jul. 1, 2001.
Periaswamy et al., "Medical image registration with partial data," Medical Image Analysis, 2000, pp. 452-464.

* cited by examiner

US 10,430,947 B2

CORRESPONDENCE PROBABILITY MAP DRIVEN VISUALIZATION

CROSS REFERENCE TO RELATED APPLICATIONS

This application is the U.S. National Phase application under 35 U.S.C. § 371 of International Application No. PCT/IB2015/059274, filed Dec. 2, 2015, published as WO 2016/097912 on Jun. 23, 2016, which claims the benefit of U.S. Provisional Patent Application No. 62/092,482 filed Dec. 16, 2014. These applications are hereby incorporated by reference herein.

FIELD OF THE INVENTION

The following generally relates to imaging and more particularly to a correspondence probability map driven visualization, and is described with particular application to computed tomography (CT). However, the following is amenable to other imaging modalities such as magnetic resonance imaging (MRI), positron emission tomography (PET), single photon emission tomography (SPECT), X-ray, ultrasound (US) and/or other imaging modalities.

BACKGROUND OF THE INVENTION

Image alignment (or image registration or image fusion) is used in follow-up image analysis to provide structure-wise or voxel-wise comparison of medical images acquired at different disease states. Visual inspection by a physician can be done, for example, by comparing a baseline image dataset and a follow-up image dataset. One approach includes displaying the two image datasets side-by-side, with or without a marker such as a cross hair overlaid at corresponding anatomical positions in the two image datasets. With this approach, the reader navigates to every potentially suspicious anatomical position followed by visual side-by-side comparison of the underlying structure.

Another approach includes alternately displaying the two aligned image datasets in a same image viewing window. Any differences identified during the comparison are likely due to pathological changes (e.g., a lesion has shown up or a tumor has shrunk) and are therefore of high importance for therapy management. With this approach, the comparison is completely delegated to the human eye, and the image reader navigates to every potentially suspicious anatomical position. The decision whether a pathological change is present is greatly supported by the human eye's capability of quickly detecting differences/movements and changes in presence, size or volume.

Yet another approach includes displaying the two aligned image datasets fused using a different color for each image dataset. Voxel intensities that are the same in both image datasets are displayed using gray-scale coding. A typical output shows most of the image datasets in gray-scale and only structures with changes in color. This approach requires image datasets that are acquired with the same imaging modality and protocol. Otherwise, parts of the fused image datasets will be displayed falsely using a color-coding scheme.

Unfortunately, all of the above comparison approaches tend to require a large amount of reading time by the physician, which could be otherwise spent with patients. In view of at least the above, there is an unresolved need for other approaches for comparing image datasets.

SUMMARY OF THE INVENTION

Aspects described herein address the above-referenced problems and others.

In one aspect, a method generates and uses a correspondence probability map for visualization of two image datasets. The method includes obtaining two image datasets and obtaining an image registration algorithm that includes a correspondence model. The method further includes registering the two image datasets to generate a displacement vector field and generating a correspondence probability map, using the correspondence model, based on the two image datasets. The method further includes using the correspondence probability map to visualize the two image datasets.

In another aspect, a computing system includes a memory device configured to store instructions, including a visualization module, and a processor that executes the instructions, which causes the processor to generate and employ a correspondence probability map for visualization of two image datasets.

In another aspect, a computer readable storage medium is encoded with computer readable instructions. The computer readable instructions, when executed by a processor, cause the processor to: obtain baseline and follow-up image datasets, obtain an image registration algorithm that includes a correspondence model, register the baseline and follow-up image datasets to generate a displacement vector field, generate a correspondence probability map with the correspondence mode and the baseline and follow-up image datasets, and employ the correspondence probability map to suppress regions of correspondence in a display of the baseline and follow-up image datasets.

The invention may take form in various components and arrangements of components, and in various steps and arrangements of steps. The drawings are only for purposes of illustrating the preferred embodiments and are not to be construed as limiting the invention.

DETAILED DESCRIPTION OF EMBODIMENTS

The following describes an approach that employs a correspondence probability map to enhance a visualization of two image datasets (e.g., baseline and follow-up image datasets). The correspondence probability map identifies regions of correspondence (e.g., no change between the baseline and follow-up image datasets) and regions of non-correspondence (e.g., which indicates pathological change) between the two image datasets. The correspondence probability map is used to visually suppress image regions with a correspondence that does not satisfy a predetermined threshold.

Figure 1:
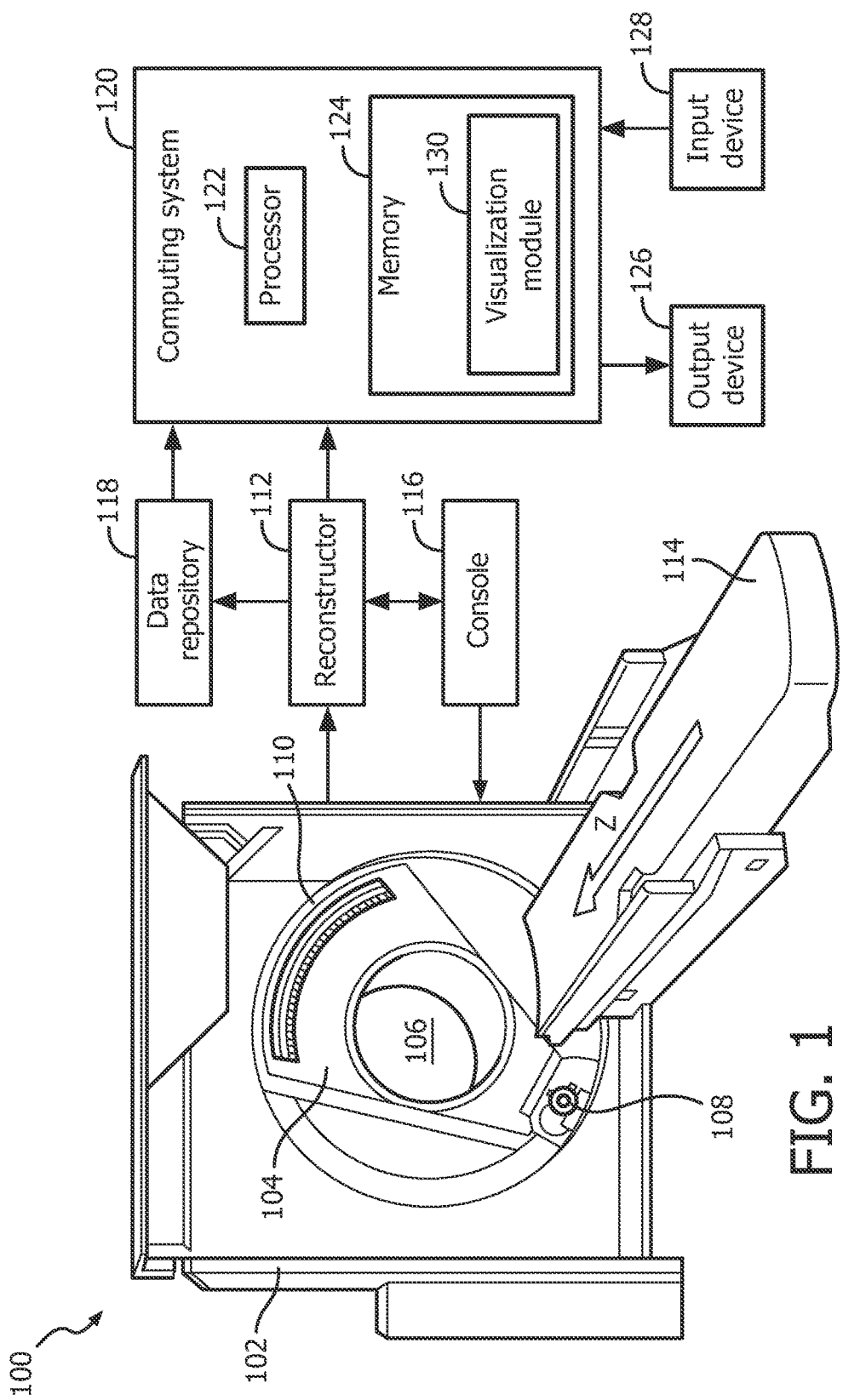
FIG. 1 schematically illustrates an example imaging system in connection with a computing system with a visualization module.

FIG. 1 illustrates an imaging system 100, such as a computed tomography (CT) scanner. The imaging system 100 includes a stationary gantry 102 and a rotating gantry 104, which is rotatably supported by the stationary gantry 102 and rotates around an examination region 106 about a z-axis. A radiation source 108, such as an x-ray tube, is rotatably supported by the rotating gantry 104, rotates with the rotating gantry 104, and emits radiation that traverses the examination region 106.

A detector array 110 subtends an angular arc opposite the examination region 106 relative to the radiation source 108, detects radiation that traverses the examination region 106, and generates projection data indicative thereof. A reconstructor 112 reconstructs the projection data and generates volumetric image data. A subject support 114 supports a subject in the examination region 106. An operator console 116 includes a human readable output device such as a monitor and an input device such as a keyboard, mouse, etc. Software resident on the console 116 allows the operator to operate the system 100.

A data repository 118 stores volumetric image data, such as volumetric image data generated by the reconstructor 112 and/or other device. In one instance, this includes image data corresponding to baseline and follow up scan, two scans acquired during a same examination but with a different protocol and/or contrast agent uptake, etc. Generally, a baseline scan is a scan at an earlier disease state, and a follow up scan is a scan at a later disease state. Examples of data repositories include a picture archiving and communication system (PACS), a radiology information system (RIS), a hospital information system (HIS), an electronic medical record (EMR), a database, a server, an imaging system, etc.

A computing system 120 includes at least one processor 122 (e.g., a microprocessor, a central processing unit, etc.) that executes at least one computer readable instruction stored in computer readable storage medium ("memory") 124, which excludes transitory medium and includes physical memory and/or other non-transitory medium. The processor 122 may also execute one or more computer readable instructions carried by a carrier wave, a signal or other transitory medium. The computing system 120 further includes an output device(s) 126 such as a display monitor, etc., and an input device(s) 128 such as a mouse, keyboard, etc.

The at least one computer readable instruction, in this example, includes a visualization module 130. As described in greater detail below, the instructions of the visualization module 130, when executed by the at least one processor 122, cause the processor 122 to generate and employ a correspondence probability map to visualize two image datasets. For example, the correspondence probability map can be used to fade out a region of a displayed image dataset(s) in response to a correspondence of the region failing to satisfy a pre-determined correspondence threshold.

The resulting display can be used to guide an image reader to one or more image positions with underlying changes, e.g., without being distracted by non-changing anatomical structures, which are faded out. In one instance, this can be beneficial for multi-modality applications where anatomical structures acquired with different modalities often appear differently in size or position. Furthermore, this can reduce the number of inspection positions, reducing the large amount of reading time by the physician, for example, relative to a configuration that does not employ the visualization module 130.

Figure 2:
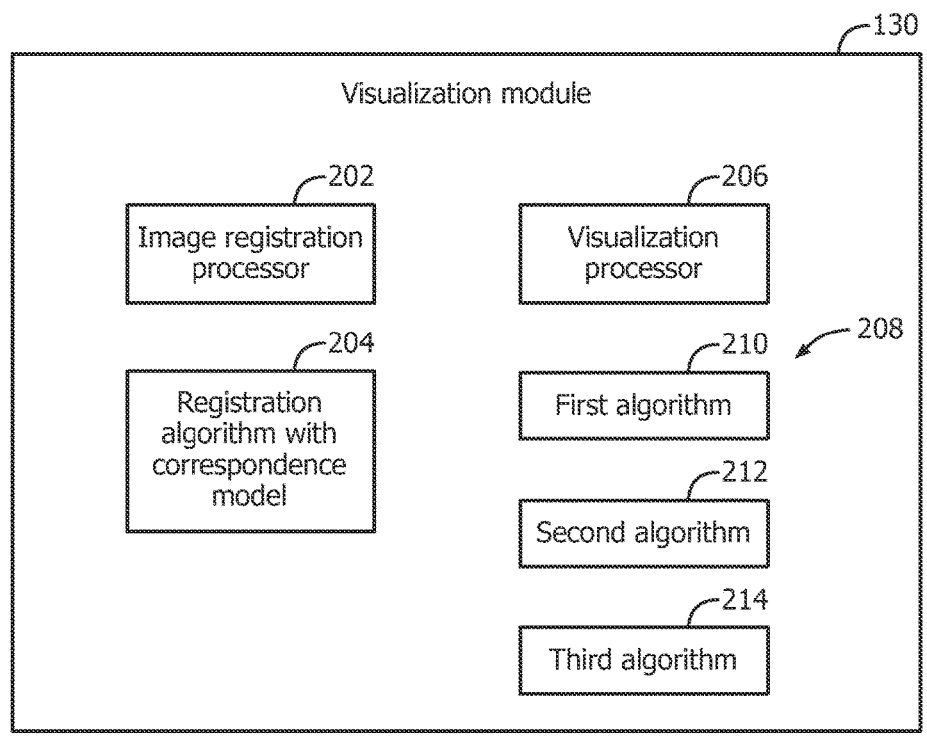
FIG. 2 schematically illustrates an example of the visualization module.

FIG. 2 schematically illustrates an example of the visualization module 130.

The visualization module 130 includes an image registration processor 202. The image registration processor 202 receives, an input, two datasets such as a first or baseline dataset for a first or baseline scan and a subsequent or follow-up dataset for a subsequent or follow-up scan, which is performed after the first or baseline scan, e.g., after a treatment. The image registration processor 202 registers the baseline and follow up datasets, which produces signal indicative of a displacement vector field between the two image datasets.

In the illustrated example, the image registration processor 202 employs a registration algorithm with a correspondence model 204. A non-limiting example of such an algorithm is discussed in Periaswamy et al., "Medical image registration with partial data," Medical Image Analysis, 2000, pp. 452-64. The image registration processor 202 employs the correspondence model to generate a correspondence probability map. For this, the image registration processor 202 determines, for every voxel position in the two image datasets, a probability that the voxels from the two image datasets correspond.

By way of non-limiting example, for a voxel of the correspondence probability map, a first predetermined value (e.g., "1") indicates the voxels of the two image datasets correspond, a second predetermine value (e.g., "0") indicates the voxels from two image datasets do not correspond, and values there between indicate a level of correspondence between correspond and not correspond. The image registration processor 202 generates the correspondence probability map based on an appropriate formulation of the residuum between the two image datasets.

By way of non-limiting example, where the two image datasets include a dataset A and a dataset B, an appropriate formulation of the residuum includes: 1) a difference between the dataset A and a deformed dataset B or a dataset B transformed with the displacement vector field (e.g., this is well-suited for datasets with same modality only); 2) a correlation between the dataset A and the deformed dataset B, and 3) a combined edge map between the dataset A and the deformed dataset B (e.g., this is well-suited for datasets originating from different modalities).

The formulation is re-computed after every (or every few, etc.) iteration steps. In one instance, image registration processor 202 performs two or more iterations to refine the correspondence probability map. This refined correspondence probability provides separation of corresponding and non-corresponding image regions and widely or fully preserves pathological changes during the registration (e.g., a tumor being smaller or larger in the baseline scan than in the follow-up scan is neither shrunk nor expanded in the deformed follow-up scan; after tissue resection the surrounding tissue is not deformed during registration; etc.).

It is to be understood that even for a single imaging modality, the correspondence probability map cannot be replaced by a simple difference between the dataset A and the deformed dataset B since non-correspondences in soft-tissue and bone structures would be handled differently.

The visualization module 130 further includes a visualization processor 206. The visualization processor employs one or more visualization algorithms 208 to construct an image for display.

With a first algorithm 210, the visualization processor 206 receives as input the baseline dataset, the follow-up dataset, the displacement vector field to match a voxel from the dataset A onto a voxel from the dataset B, and the correspondence probability map. The visualization processor 206 applies the displacement vector field to the correspondence probability map and generates a second correspondence probability map. The first correspondence probability map corresponds to the dataset A and the second correspondence probability map corresponds to dataset B.

The visualization processor 206 visually displays each of the two datasets in different image viewing windows or ports next to each other. Each correspondence probability map is used to fade out all image regions with existing correspondences in a respective image dataset. The visualization processor 206 can also link the two image datasets together on a voxel(s) basis. A reader can then select via the input device 128 a voxel in one display (e.g., clicking on the image) at a position in the first image, and the visualization processor 206 can, from the displacement vector field, identify and display the matching position in the other image dataset.

With a second example algorithm 212, the visualization processor 206 receives as input the baseline dataset, the deformed follow-up dataset, and the correspondence probability map. The visualization processor 206 concurrently displays both datasets, for example, as a fused dataset. The visualization processor 206 utilizes the probability map to fade out image regions with existing correspondences.

With a third example algorithm 214, the visualization processor 206 receives as input the baseline dataset, the deformed follow-up dataset, and the correspondence probability map. The visualization processor 206 displays both datasets in a same image viewing window in an alternating fashion, e.g., switching between the two datasets after lapse of a predetermined time duration (e.g., every 0.5 seconds). The correspondence probability map is used to fade out all image regions with existing correspondences.

Other algorithms are also contemplated herein. The input device 128, in one instance, includes a mechanical or a software based slider, knob, or the like, which can be used by a user to set and/or change a level of suppression for the corresponding image regions. For 100% suppression level, only image regions with missing anatomical correspondence are displayed in a toggling/flickering manner. A suppression level of 70% to 90% can be used to also display anatomical context.

In the above example, the two image datasets include baseline and follow up image datasets. Where the two image datasets are acquired in a same session, but with, e.g., different protocol or contrast agent uptake, the image datasets can be compared and visualized without prior registration. In this case, the correspondence probability map is determined based on the residuum of the original data.

In a variation, image regions with little or no correspondence (i.e., with a value below a threshold t in the correspondence probability map) are analyzed and sorted according to their importance. Importance of a region can be based on, e.g., volume, shape or anatomical position. The image reader is then guided through the sorted list of non-correspondences for closer inspection.

In another variation, the correspondence probability map generated during registration is editable and modified, for example, by a user and/or otherwise. By way of non-limiting example, the clinician reading an image may give feedback, e.g., via the input device 128, such as indicating or assigning a higher or lower weight to one or more non-correspondences in the correspondence probability map. This can be done to down-weight a false positive, remove a false positive, etc. Once the correspondence probability map is modified, the registration can be repeated with the modified correspondence probability map.

Figure 3:
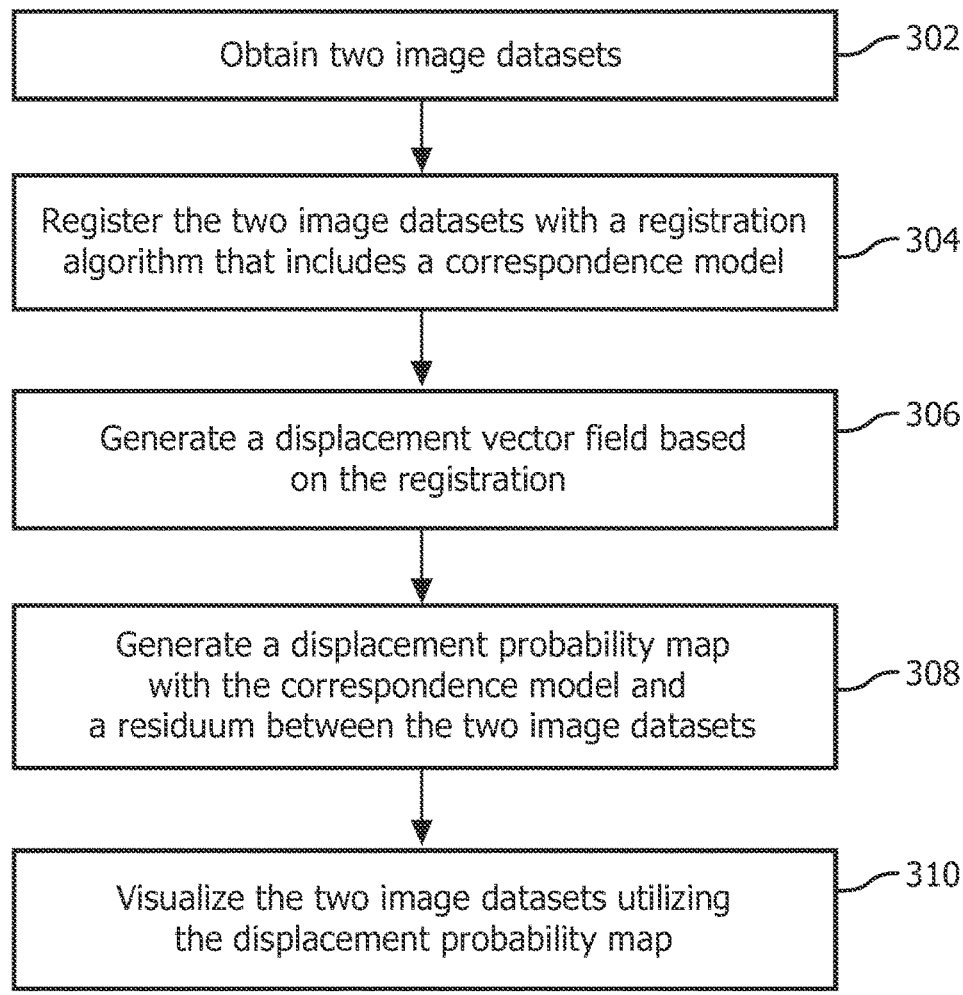
FIG. 3 illustrates an example method for employing a correspondence probability map for visualization of image datasets.

FIG. 3 illustrates a method for generating and using a correspondence probability map for visualization of two image datasets.

It is to be appreciated that the ordering of the acts in the methods described herein is not limiting. As such, other orderings are contemplated herein. In addition, one or more acts may be omitted and/or one or more additional acts may be included.

At 302, the two image datasets are obtained. As described herein, in one instance the two image datasets include a baseline image dataset and a follow up image dataset.

At 304, the two image datasets are registered using a registration algorithm that includes a correspondence model.

At 306, a displacement vector field is created based on the registration.

At 308, a correspondence probability map is generated using the correspondence model and a residuum between the two image datasets, as described herein and/or otherwise.

At 310, the correspondence probability map is utilized to visualize the two datasets, as described herein and/or otherwise.

In a variation, between acts 302 and 304, a mask image is added to the two image datasets. The mask image includes at least one region down-weighted or up-weighted by the reading clinician and is a "fixed constraint" in that probabilities included in the correspondence probability map are initialized with the values from the mask image and are not allowed to change during iteration.

The method herein may be implemented by way of computer readable instructions, encoded or embedded on computer readable storage medium, which, when executed by a computer processor(s), cause the processor(s) to carry out the described acts. Additionally or alternatively, at least one of the computer readable instructions is carried by a signal, carrier wave or other transitory medium.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A method for generating and using a correspondence probability map for visualization of two image datasets, comprising:
    obtaining the two image datasets;
    obtaining an image registration algorithm that includes a correspondence model;
    registering the two image datasets to generate a displacement vector field;
    generating a correspondence probability map, using the correspondence model, the displacement vector field, and a combined edge map between one of the two image datasets and the other one of the two image datasets deformed with the displacement vector field, based on the two image datasets; and
    using the correspondence probability map to visualize the two image datasets.

2. The method of claim 1, further comprising:
    generating a second correspondence probability map by applying the displacement vector field to the correspondence probability map;
    displaying a first of the two image datasets in a first image display window;
    fading image regions of the first of the two image datasets with correspondence with the correspondence probability map;
    displaying a second of the two image datasets in a second image display window; and fading image regions of the second of the two image datasets with correspondence with the second correspondence probability map based on a level of suppression for the corresponding image regions.

3. The method of claim 1, further comprising:
receiving a feedback signal indicative of a user change to at least one value of the correspondence probability map;
generating a modified correspondence probability map based on the feedback signal; and
re-registering the two image datasets with the modified correspondence probability map to generate the displacement vector field.

4. A computing system, comprising:
a memory device configured to store instructions; and
a processor configured to execute the instructions, which is to cause the processor to:
register two image data sets, with an image registration algorithm that includes a correspondence model;
generate a displacement vector field based on the registration;
generate and employ a correspondence probability map for visualization of the two image datasets based on a correspondence model that includes the displacement vector field and a combined edge map between one of the two image datasets and the other one of the two image datasets deformed with the displacement vector field.

5. The computing system of claim 4, wherein the processor is configured to
suppress image regions in at least one of the two image data sets with a correspondence that does not satisfy a pre-determined threshold according to the correspondence probability map.

6. The computing system of claim 4, wherein the processor is configured to compute the correspondence probability map based on a difference between one of the two image datasets.

7. The computing system of claim 4, wherein the processor is configured to compute the correspondence probability map based on a correlation between the two image datasets.

8. The computing system of claim 4, wherein the configured processor is further configured to:
assign a correspondence value to image regions; and wherein
rank the image regions with correspondence values that fall below a predetermined threshold level of correspondence based on a level of importance, wherein the level of importance is based on at least one of volume, shape, or anatomical position.

9. The computing system of claim 4, wherein the processor is configured to generate a second correspondence probability map by applying the displacement vector field to the correspondence probability map, to display a first of the two image datasets in a first image display window, to fade image regions of the first of the two image datasets with correspondence with the correspondence probability map, to display a second of the two image datasets in a second image display window, and to fade image regions of the second of the two image datasets with correspondence with the second correspondence probability map.

10. The computing system of claim 4, wherein the processor is configured to fuse the deformed dataset and a second of the two image datasets; and to fade image regions of the fused image datasets with correspondence with the correspondence probability map.

11. The computing system of claim 4, wherein the processor is configured to alternate display of a first of the two image datasets and a second of the two image datasets in a same image viewing window, and to fade image regions of the displayed image datasets with correspondence with the correspondence probability map.

12. The computing system of claim 9, wherein the processor is configured to receive a signal indicative of a change in a level of suppression for the corresponding image regions and to adjust the level of suppression for the corresponding image regions based on the signal.

13. The computing system of claim 9, wherein the processor is configured to modify the correspondence probability map in response to an input indicative of a user change to at least one value of the correspondence probability map, which generates an updated correspondence probability map, and to employ the updated correspondence probability map for visualization of two image datasets.

14. The computing system of claim 4, wherein the processor is configured to add a user generated mask image to the two image datasets, wherein the mask image includes at least one voxel either down-weighted or up-weighted, and the processor is configured to employ the mask image to initialize at least one value of the correspondence probability map with a static value that does not change.

15. A computer readable storage medium encoded with computer readable instructions, which, when executed by a processor, causes the processor to:
obtain two image datasets;
obtain an image registration algorithm that includes a correspondence model;
register two image datasets to generate a displacement vector field;
generate a correspondence probability map with the correspondence model, the displacement vector field, a combined edge map between one of the two image datasets and the other one of the two image datasets deformed with the displacement vector field, and two image datasets; and
employ the correspondence probability map to suppress regions of correspondence in a display of the two image datasets.

16. The computer readable storage medium of claim 15, wherein the instructions further cause the processor to:
compute the correspondence probability map based on a difference between one of the two image datasets.

17. The computer readable storage medium of claim 15, wherein the instructions further cause the processor to:
compute the correspondence probability map based on a correlation between the two image datasets.

18. The computer readable storage medium of claim 15, wherein the instructions further cause the processor to:
generate a second correspondence probability map by applying the displacement vector field to the correspondence probability map, to display a first of the two image datasets in a first image display window, to fade image regions of the first of the two image datasets with correspondence with the correspondence probability map, to display a second of the two image datasets in a second image display window, and to fade image regions of the second of the two image datasets with correspondence with the second correspondence probability map.

19. The computer readable storage medium of claim 15, wherein the instructions further cause the processor to:

fuse the deformed dataset and a second of the two image datasets; and to fade image regions of the fused image datasets with correspondence with the correspondence probability map.

20. The computer readable storage medium of claim 15, wherein the instructions further cause the processor to:
to alternate display of the first of the two image datasets and a second of the two image datasets in a same image viewing window, and to fade image regions of the displayed image datasets with correspondence with the correspondence probability map.

* * * * *